United States Patent
Kageyama

(10) Patent No.: US 10,391,819 B2
(45) Date of Patent: Aug. 27, 2019

(54) PNEUMATIC TIRE

(71) Applicant: SUMITOMO RUBBER INDUSTRIES, LTD., Kobe-shi, Hyogo (JP)

(72) Inventor: Naoki Kageyama, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 498 days.

(21) Appl. No.: 14/856,077

(22) Filed: Sep. 16, 2015

(65) Prior Publication Data
US 2016/0121659 A1 May 5, 2016

(30) Foreign Application Priority Data

Oct. 31, 2014 (JP) ................. 2014-223359

(51) Int. Cl.
B60C 11/11 (2006.01)
B60C 11/03 (2006.01)
B60C 11/13 (2006.01)

(52) U.S. Cl.
CPC .......... B60C 11/11 (2013.01); B60C 11/0306 (2013.01); B60C 11/1384 (2013.01);
(Continued)

(58) Field of Classification Search
CPC ............. B60C 11/11; B60C 2011/0381; B60C 2011/0346; B60C 11/0306; B60C 2011/133
See application file for complete search history.

(56) References Cited

U.S. PATENT DOCUMENTS 4,945,963 A * 8/1990 Fujiwara ................. B60C 11/01
152/209.22
5,160,385 A * 11/1992 Goto .................... B60C 11/0309
152/209.19
(Continued)

FOREIGN PATENT DOCUMENTS

EP 1 176 034 A2 1/2002
EP 2 048 007 A1 4/2009
(Continued)

OTHER PUBLICATIONS

English machine translation of JP07-266809. (Year: 1995).*
(Continued)

Primary Examiner — Robert C Dye
(74) Attorney, Agent, or Firm — Birch, Stewart, Kolasch & Birch, LLP

(57) ABSTRACT

A pneumatic tire includes a tread portion provided with a circumferentially and continuously extending zigzag shoulder main groove located adjacent to a tread edge to define a shoulder portion axially outward of the shoulder main groove and a central lateral groove extending axially inwardly from the shoulder main groove. The shoulder portion includes a top surface having an axially inner edge facing the shoulder main groove and a sidewall extending radially inwardly from the inner edge. The sidewall of the shoulder portion is provided with a shoulder dent portion dented axially outwardly from the shoulder main groove. The central lateral groove is located so that an extended portion in which the central lateral groove is extended axially outwardly overlaps with the shoulder dent portion at least partially.

16 Claims, 15 Drawing Sheets

(52) U.S. Cl.
CPC ............... *B60C 2011/0346* (2013.01); *B60C 2011/0365* (2013.01); *B60C 2011/0372* (2013.01); *B60C 2011/0381* (2013.01); *B60C 2011/133* (2013.01)

(56) References Cited

U.S. PATENT DOCUMENTS

| | | | |
|---|---|---|---|
| 2003/0102064 A1* | 6/2003 | Below | B60C 11/0309 152/209.18 |
| 2005/0016656 A1* | 1/2005 | Kuroki | B60C 11/00 152/548 |
| 2006/0102267 A1* | 5/2006 | Takahashi | B60C 11/0306 152/209.18 |
| 2007/0012389 A1* | 1/2007 | Ito | B60C 11/0306 152/209.22 |
| 2008/0047643 A1* | 2/2008 | Takahashi | B60C 11/0306 152/209.26 |
| 2008/0047644 A1* | 2/2008 | Yoshikawa | B60C 11/0309 152/209.27 |
| 2012/0247632 A1 | 10/2012 | Hayashi | |
| 2014/0130949 A1* | 5/2014 | Maehara | B60C 11/033 152/209.8 |
| 2016/0089939 A1* | 3/2016 | Oji | B60C 5/12 152/209.18 |
| 2016/0193881 A1* | 7/2016 | Nakayama | B60C 11/0309 152/209.15 |

FOREIGN PATENT DOCUMENTS

| | | |
|---|---|---|
| EP | 2 769 855 A2 | 8/2014 |
| EP | 3000622 A1 | 3/2016 |
| JP | 07-266809 * | 10/1995 |
| JP | 09-136514 * | 5/1997 |
| JP | 9-300915 A | 11/1997 |
| JP | 2012-201335 A | 10/2012 |

OTHER PUBLICATIONS

English machine translation of JP09-136514. (Year: 1997).*
European Office Action, dated Dec. 15, 2017, for corresponding European Application No. 15186783.5.

* cited by examiner

PNEUMATIC TIRE

BACKGROUND OF THE INVENTION

Field of the Invention

The present invention relates to pneumatic tires, and in particular, relates to a pneumatic tire that may exhibit in excellent on-snow performance.

Description of the Related Art

Japanese Unexamined Patent Application Publication No. 2012-201335 discloses a pneumatic tire that includes a tread portion having a shoulder main groove to define a shoulder portion between the shoulder main groove and a tread edge, wherein the shoulder portion is provided with a shoulder dent portion dented axially outwardly from the shoulder main groove. When the pneumatic tire travels on snowy road, the shoulder dent portion may compress snow which be introduced therein and then the shoulder dent portion may shear it to increase traction on snowy road.

Unfortunately, since the shoulder main groove of the pneumatic tire circumferentially extends in a straight manner, traction performance on snowy road is not sufficient. Furthermore, there is room for improvement with respect to the location of the shoulder dent portion on the pneumatic tire in view of further improving on-snow performance.

SUMMARY OF THE INVENTION

In view of the above problems in the conventional art, the present invention has an object to provide a pneumatic tire that may exhibit in excellent on-snow performance.

According to one aspect of the invention, a pneumatic tire comprises a tread portion provided with a circumferentially and continuously extending zigzag shoulder main groove located adjacent to a tread edge to define a shoulder portion axially outward of the shoulder main groove and a central lateral groove extending axially inwardly from the shoulder main groove. The shoulder portion comprises a top surface having an axially inner edge facing the shoulder main groove and a sidewall extending radially inwardly from the inner edge. The sidewall of the shoulder portion is provided with a shoulder dent portion dented axially outwardly from the shoulder main groove. The central lateral groove is located so that an extended portion in which the central lateral groove is extended axially outwardly overlaps with the shoulder dent portion at least partially.

In another aspect of the invention, the shoulder main groove may comprise a first inclined element inclined with respect to a circumferential direction of the tire and a second inclined element inclined in an opposite direction to the first inclined element, and the first inclined element and the second inclined element may have an angle in a range of from 10 to 45 degrees with respect to the circumferential direction of the tire.

In another aspect of the invention, the central lateral groove has a width W2 at the shoulder main groove, the shoulder dent portion has a maximum width W1 measured along a longitudinal direction of a part of the shoulder main groove to which the shoulder dent portion is connected, and a width ratio W1/W2 of the maximum width W1 of the shoulder dent portion to the width W2 of the central lateral groove may be in a range of from 1.0 to 1.5.

In another aspect of the invention, the central lateral groove may be connected to the shoulder main groove while gradually increasing its width.

In another aspect of the invention, the shoulder dent portion may have a length W3 in a range of from 3.0 to 7.0 mm measured perpendicular to a longitudinal direction of a part of the shoulder main groove to which the shoulder dent portion is connected.

In another aspect of the invention, the shoulder main groove may comprise a first inclined element inclined with respect to a circumferential direction of the tire and a second inclined element inclined in an opposite direction to the first inclined element, the first inclined element has a circumferential length greater than that of the second inclined element, and the shoulder dent portion may be communicated with the first inclined element.

In another aspect of the invention, the central lateral groove may be communicated with the first inclined element to form an angle in a range of from 80 to 90 degrees.

In another aspect of the invention, an axial distance from a tire equator to an axially outer end of the shoulder dent portion may be in a range of from 0.55 to 0.66 times a tread half width which is an axial distance from the tire equator to the tread edge.

In another aspect of the invention, the tread portion may further comprise a central portion located axially inward of the shoulder main groove, wherein the central portion comprises a top surface having an axially outer edge facing the shoulder main groove and a sidewall extending radially inwardly from the outer edge. The sidewall of the central portion may be provided with a central dent portion dented axially inwardly from the shoulder main groove, and the central dent portion and the shoulder dent portion may be arrange alternately in a circumferential direction of the tire.

DESCRIPTION OF THE EMBODIMENTS

Figure 1:
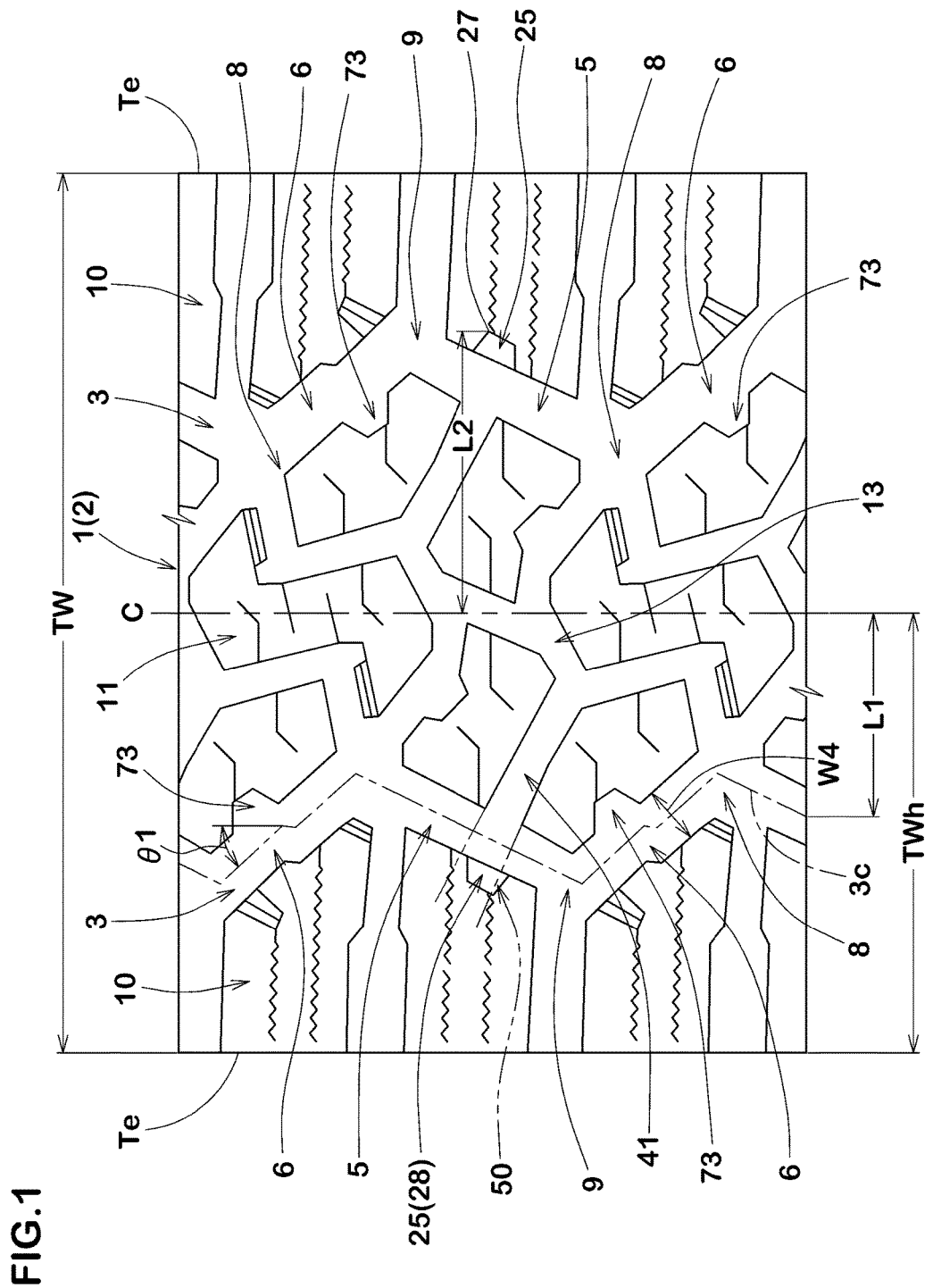
FIG. 1 is a development view of a tread portion of a pneumatic tire in accordance with an embodiment of the present invention.

An embodiment of the present invention will be explained below with reference to the accompanying drawings. It should be noted that like elements are denoted by the same reference numerals throughout the disclosure.

FIG. 1 illustrates a tread portion 2 of a pneumatic tire 1 in accordance with an embodiment of the present invention. The pneumatic tire 1, for example, may preferably be embodied for SUV that suitably travel on a rough terrain.

As shown in FIG. 1, the tread portion 2 of the tire 1 is provided with a pair of shoulder main grooves 3 and 3.

Each shoulder main groove 3 extends in a zigzag manner in a circumferential direction of the tire and is located adjacent to each tread edge Te.

In each side of the tire equator C, the tread edge Te refers to an axially outermost edge of the ground contacting patch of the tread portion 2 which occurs under a normally inflated loaded condition when the camber angle of the tire is zero. The normally inflated loaded condition is such that the tire 1 is mounted on a standard wheel rim with a standard pressure and loaded with a standard tire load.

The standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

The standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

The standard tire load is a tire load officially approved or recommended for the tire by standards organizations, wherein the standard load is the "maximum load capacity" in JATMA, the "Load Capacity" in ETRTO, and the maximum value given in the above-mentioned table in TRA or the like.

In this application including specification and claims, various dimensions, positions and the like of the tire refer to those under a normally inflated unloaded condition of the tire unless otherwise noted. The normally inflated unloaded condition is such that the tire 1 is mounted on the standard wheel rim with the standard pressure but loaded with no tire load. The tread width TW is defined as the width measured under the normally inflated unloaded condition, as the axial distance between the tread edges Te and Te.

The shoulder main groove 3, for example, includes a first inclined element 5 inclined at an angle with respect to the circumferential direction of the tire and a second inclined element 6 inclined in an opposite direction to the first inclined element 5. The first inclined element 5 and the second inclined element 6 are arranged alternately in the circumferential direction of the tire. In this embodiment, the first inclined element 5 has a circumferential length greater than that of the second inclined element 6.

The first inclined element 5 and the second inclined element 6 have an angle θ1 in a range of from 10 to 45 degrees, more preferably in a range of from 10 to 25 degrees with respect to the circumferential direction of the tire, for example. The first and second inclined elements 5 and 6 may improve traction on icy or snowy road.

The shoulder main groove 3 includes a plurality of inner corner portions 8 each protruding axially inwardly and a plurality of outer corner portions 9 each protruding axially outwardly. These inner corner portions 8 and outer corner portions 9 are formed alternately in the circumferential direction of the tire.

The shoulder main groove 3, for example, has a width W4 in a range of from 2.5% to 8.0% of the tread width TW in order to ensure not only steering stability on dry road but also wet performance.

The shoulder main groove 3 preferably has a depth in a range of from 8 to 15 mm as the SUV tire, for example.

When the shoulder main groove 3 comes into contact with a road, it may be compressed in the longitudinal direction due to compressive deformation of the tread portion 2. Accordingly, when the tire travels on snowy road, snow introduced into the shoulder main groove 3 may strongly be compressed by the respective inner and outer corner portions 8 and 9 so as to be formed as a hard snow column, and then it may be sheared to generate a large traction.

In order to further improve the advantageous effect above, an axial distance L1 from the tire equator C to the center line 3c of the shoulder main groove 3 is preferably set in a range of from 0.35 to 0.65 times a tread half width TWh which is an axial distance from the tire equator C to one of the tread edges Te. Namely, the axial distance L1 may vary in the above range in the circumferential direction of the tire.

The tread portion 2 further includes a pair of shoulder portions 10 each located axially outward of the shoulder main grooves 3 and a central portion 11 defined between the pair of shoulder main grooves 3 and 3.

Figure 2:
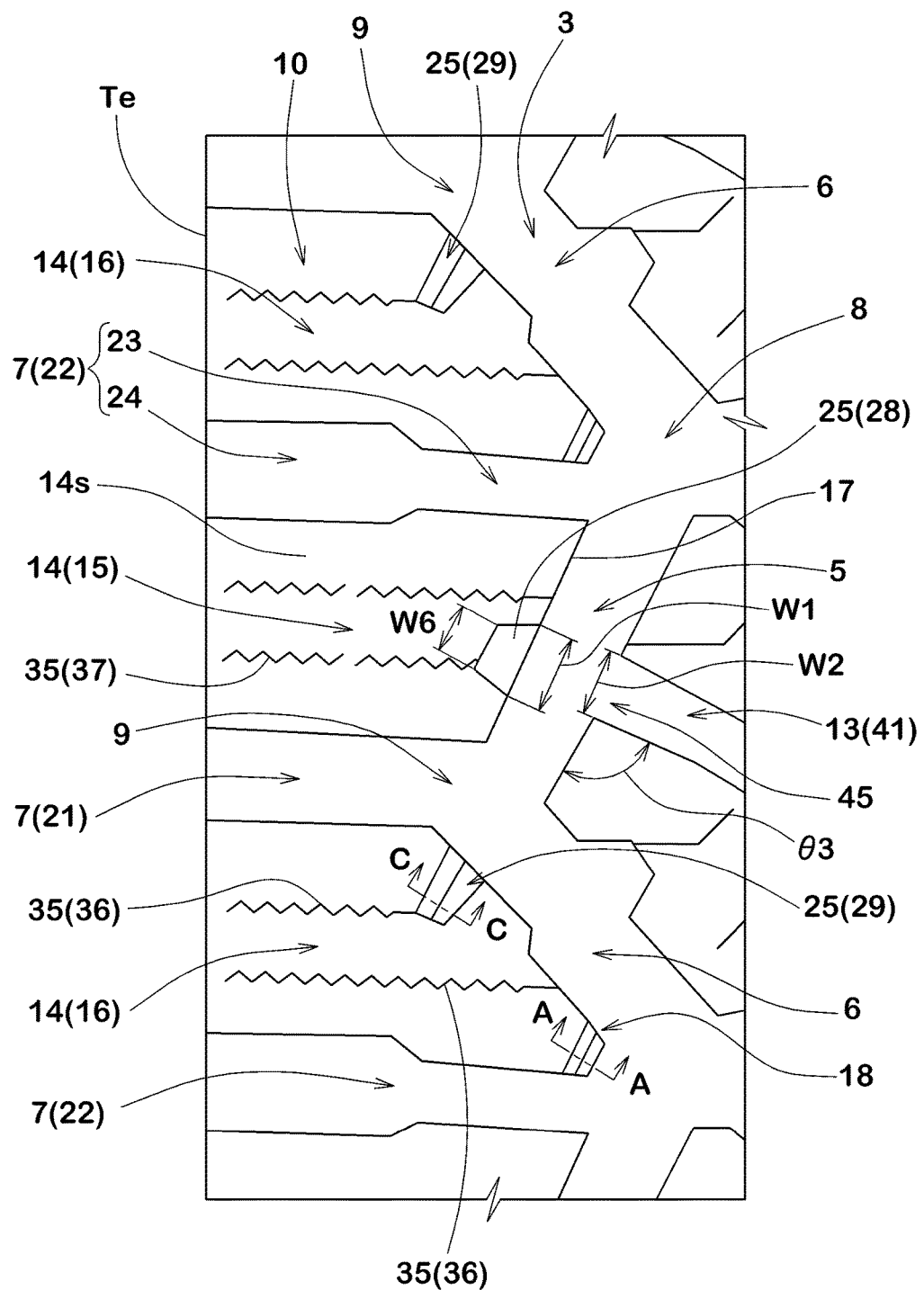
FIG. 2 is an enlarged view of a shoulder portion shown in FIG. 1.

FIG. 2 illustrates an enlarged view of the shoulder portion 10. As shown in FIG. 2, the shoulder portion 10 is provided with a plurality of shoulder lateral grooves 7 each extending from the shoulder main groove 3 to the tread edge Te so as to define a plurality of shoulder blocks 14.

The shoulder lateral grooves 7 include a first shoulder lateral groove 21 having a substantially constant width and a second shoulder lateral groove 22 having a width varying its longitudinal direction, which are alternately arranged in the circumferential direction of the tire.

The first shoulder lateral groove 21 is communicated with one of the outer corner portions 9 of the shoulder main groove 3. In this embodiment, each first shoulder lateral groove 21 extends in a straight manner.

The second shoulder lateral groove 22 is communicated with the first inclined element 5 of the shoulder main groove 3 except the inner corner portions 8. The second shoulder lateral groove 22 includes an axially inner portion 23 connected to the shoulder main groove 3 and an axially outer portion 24 having a width greater than that of the inner portion 23. Such a second shoulder lateral groove 22 may improve wet performance as well as wandering performance.

The shoulder blocks 14 include a first shoulder block 15 and a second shoulder block 16, which are arranged alternately in the circumferential direction of the tire. The first shoulder block 15 is surrounded among the first shoulder lateral groove 21, the second shoulder lateral groove 22 and the first inclined element 5 of the shoulder main groove 3. The second shoulder block 16 is surrounded among the first shoulder lateral groove 21, the second shoulder lateral groove 22 and the second inclined element 6 of the shoulder main groove 3.

Each of the first and second shoulder blocks 15 and 16 has a top surface 14s having a trapezoid-like shape that includes an apex portion 18 protruding axially inwardly.

Figure 3:
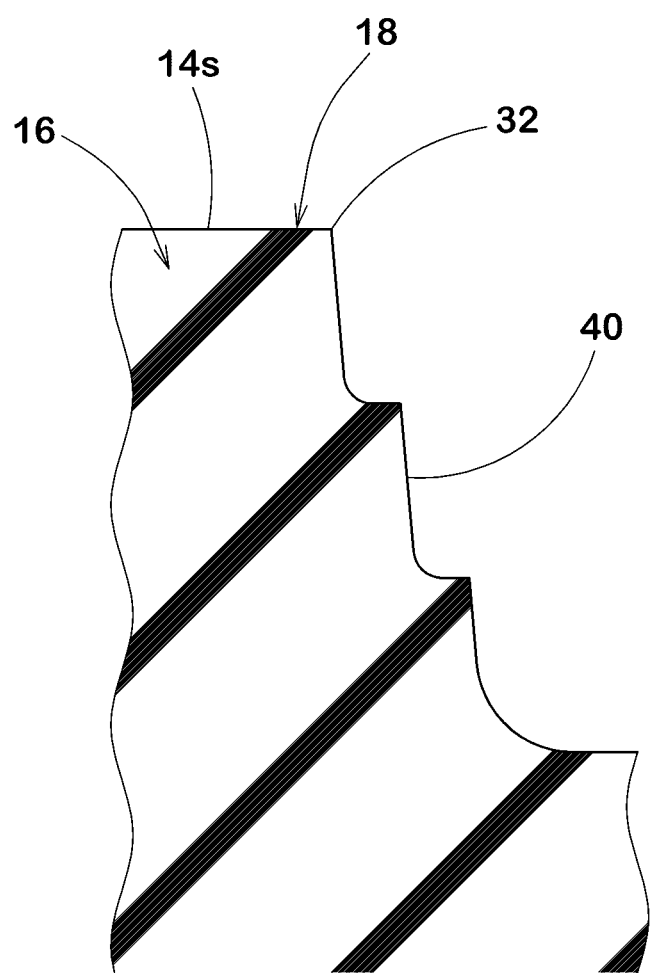
FIG. 3 is a cross-sectional view of an apex portion of a second shoulder block taken along lines A-A of FIG. 2.

FIG. 3 illustrates a cross-sectional view of the apex portion 18 of the second shoulder block 16 taken along lines A-A of FIG. 2. As shown in FIG. 3, the apex portion 18 of the second shoulder block 16 preferably includes a sidewall 40 extending radially inwardly in a step-like manner from an edge 32 of the top surface 14s. The apex portion 18 may increase traction on mud terrain while preventing the shoulder main groove 3 from stone-biting.

As shown in FIGS. 2 and 3, each shoulder block 14 is provided with a shoulder dent portion 25 on the side of the shoulder main groove 3. The shoulder dent portion 25 is a small recess or indentation in a surface of each shoulder block 14 and is dented inward of the block from both the top surface 14s and the sidewall 40 of shoulder blocks 14. Since each shoulder dent portion 25 may provide a space for compressing snow adjacent to the shoulder main groove 3, a large traction on snowy road may be generated.

The shoulder dent portion 25 has a width, which is measured along the longitudinal direction of the element of the shoulder main groove 3 to which the shoulder dent portion 25 is connected, reducing toward inward of the block. Such a shoulder dent portion 25 may be useful to compress snow strongly to be introduced therein.

As shown in FIG. 1, an axial distance L2 from the tire equator C to an axially outer end 27 of the shoulder dent portion 25 is preferably in a range of not less than 0.50 times, more preferably not less than 0.55 times, but preferably not more than 0.70 times, more preferably not more than 0.66 times the tread half width TWh in order to prevent uneven wear on shoulder blocks 14 while ensuring the advantageous effects.

As shown in FIG. 2, the shoulder dent portions 25, for example, include a first shoulder dent portion 28 formed on the respective first shoulder blocks 15 and a second shoulder dent portion 29 formed on the respective second shoulder blocks 16.

Figure 4:
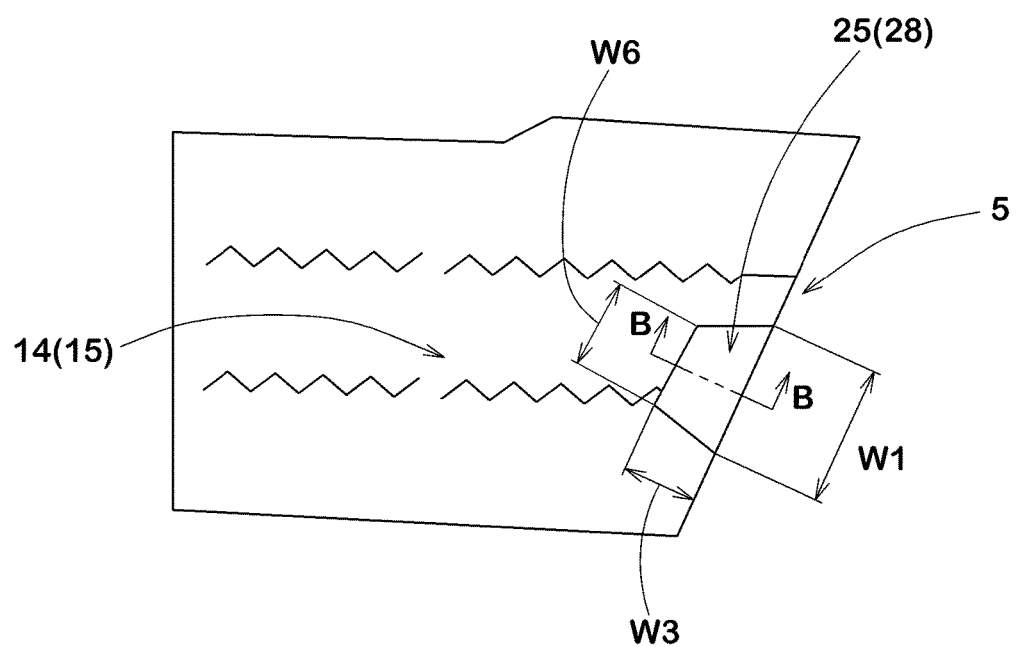
FIG. 4 is an enlarged view of a first shoulder dent portion of FIG. 2.

FIG. 4 illustrates an enlarged view of the first shoulder block 15. As shown in FIG. 4, the first shoulder dent portion 28 is preferably arranged so as to face the first inclined element 5. Preferably, the maximum width W1 of the first shoulder dent portion 28 is in a range of not less than 5.0 mm, more preferably not less than 7.5 mm, but preferably not more than 15.0 mm, more preferably not more than 12.5 mm. Such a first shoulder dent portion 28 may increase traction on snowy road while ensuring shoulder block rigidity.

Preferably, the ratio W1/W6 of the maximum width W1 of the first shoulder dent portion 28 to a minimum width W6 of the first shoulder dent portion 28 is in a range of not less than 1.50, more preferably not less than 1.65, but preferably not more than 1.90, more preferably not more than 1.75.

The first shoulder dent portion 28 has a length W3 in a range of not less than 3.0 mm, more preferably not less than 4.0 mm, but preferably not more than 7.0 mm, more preferably not more than 6.0 mm measured perpendicular to a longitudinal direction of a part of the shoulder main groove 3 to which the shoulder dent portion 28 is connected.

Figure 5:
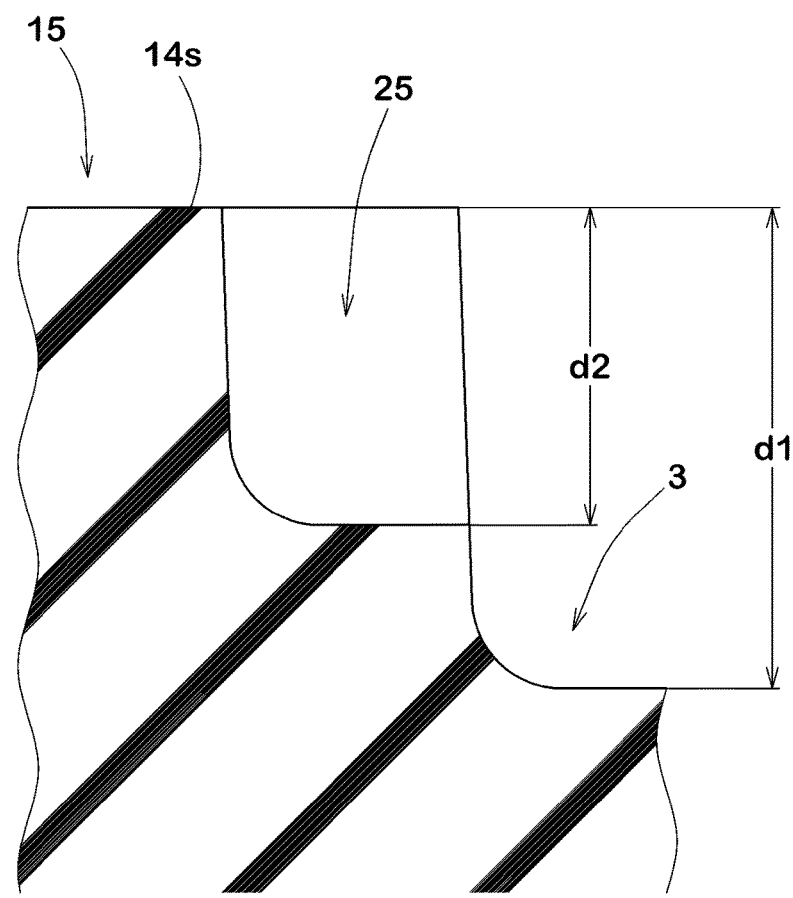
FIG. 5 is a cross-sectional view of the first shoulder dent portion taken along lines B-B of FIG. 4.

FIG. 5 illustrates a cross-sectional view of the first shoulder dent portion 28 taken along lines B-B of FIG. 4. As shown in FIG. 5, the shoulder dent portion 25 has a depth d2 smaller than the depth d1 of the shoulder main groove 3. The depth d2 of the shoulder dent portion 25 is preferably in a range of from 0.5 to 0.9 times the depth d1 of the shoulder main groove 3.

As shown in FIG. 2, the second shoulder dent portion 29 is preferably arranged at a location such that the second shoulder dent portion 29 and the first inclined element 5 of the shoulder main groove 3 form a straight groove through the second inclined element 6. Such a second shoulder dent portion 29 may compress snow strongly which was pushed and moved thereto by the first inclined element 5 of the shoulder main groove 3.

Figure 6:
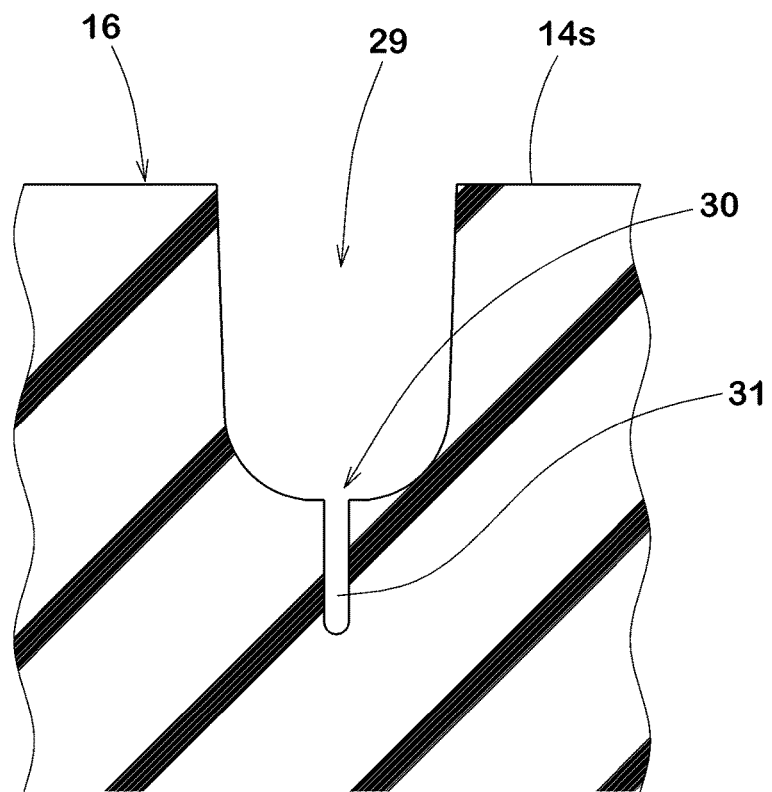
FIG. 6 is a cross-sectional view of a second shoulder dent portion taken along lines C-C of FIG. 2.

FIG. 6 illustrates a cross-sectional view of the second shoulder dent portion 29 taken along lines C-C of FIG. 2. As shown in FIG. 6, the second shoulder dent portion 29 preferably includes a bottom 30 that is provided with a sipe 31 having a width in a range of from 0.5 to 1.0 mm. The sipe 31 may be useful to expand a volume of the second shoulder dent portion 29 while ensuring shoulder block rigidity, thereby improving steering stability on dry road and wet performance in a well balanced manner.

As shown in FIG. 2, each of the first shoulder blocks 15 and the second shoulder blocks 16 is further provided with at least one shoulder sipe 35 extending in a zigzag manner.

The at least one shoulder sipe 35 includes a semi-opened sipe 36 that extends from either one of the shoulder main groove 3 or the shoulder dent portion 25 and terminates within the block and a closed sipe 37 that has both ends terminating within the block 16. Such a shoulder sipe 35 may reduce stress concentration on the shoulder block while ensuring block rigidity.

Figure 7:
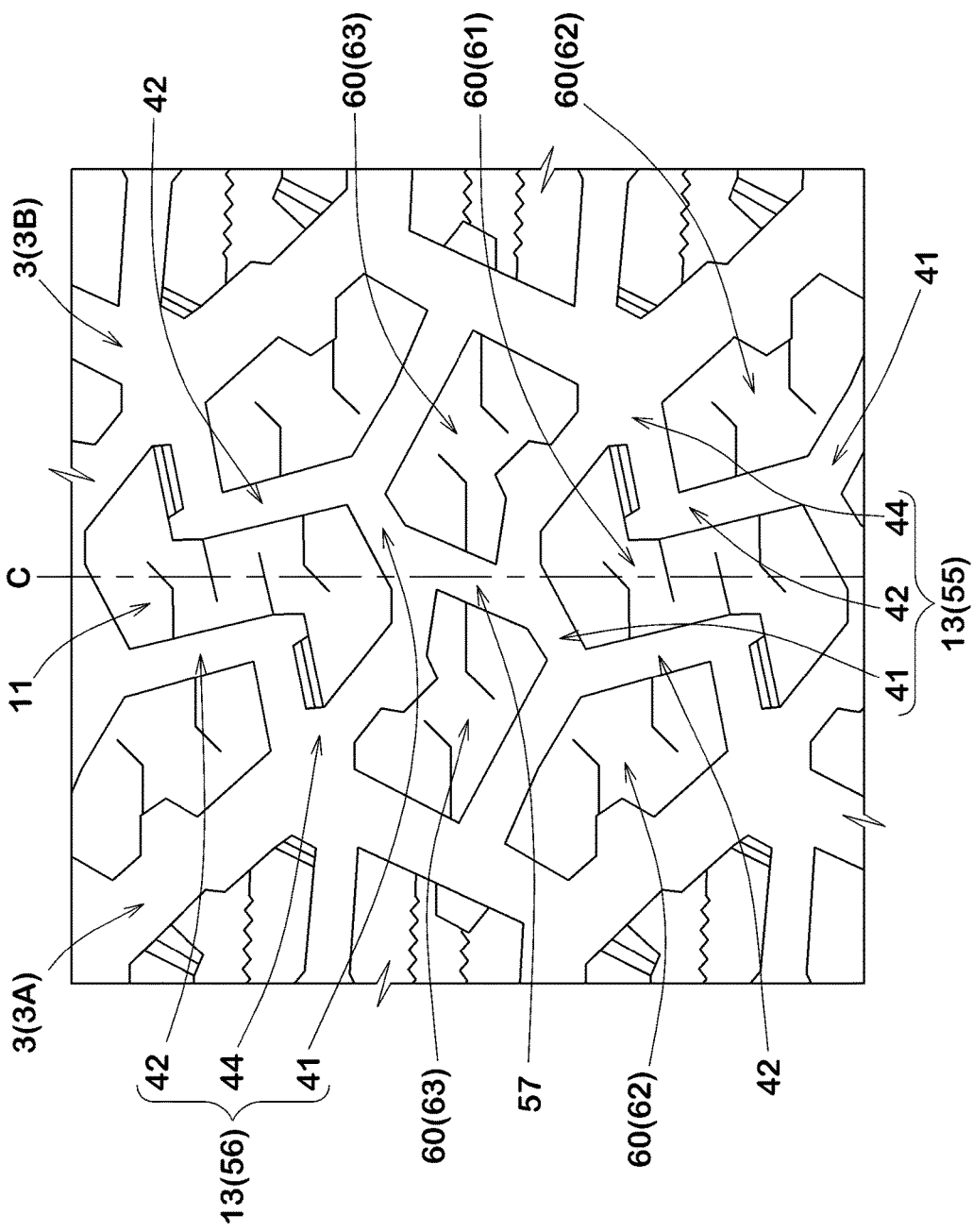
FIG. 7 is an enlarged view of a central portion illustrated in FIG. 1.

FIG. 7 illustrates an enlarged view of the central portion 11. As shown in FIG. 7, the central portion 11 is provided with a plurality of central lateral grooves 13 that are arranged in the circumferential direction of the tire apart from one another.

Figure 8:
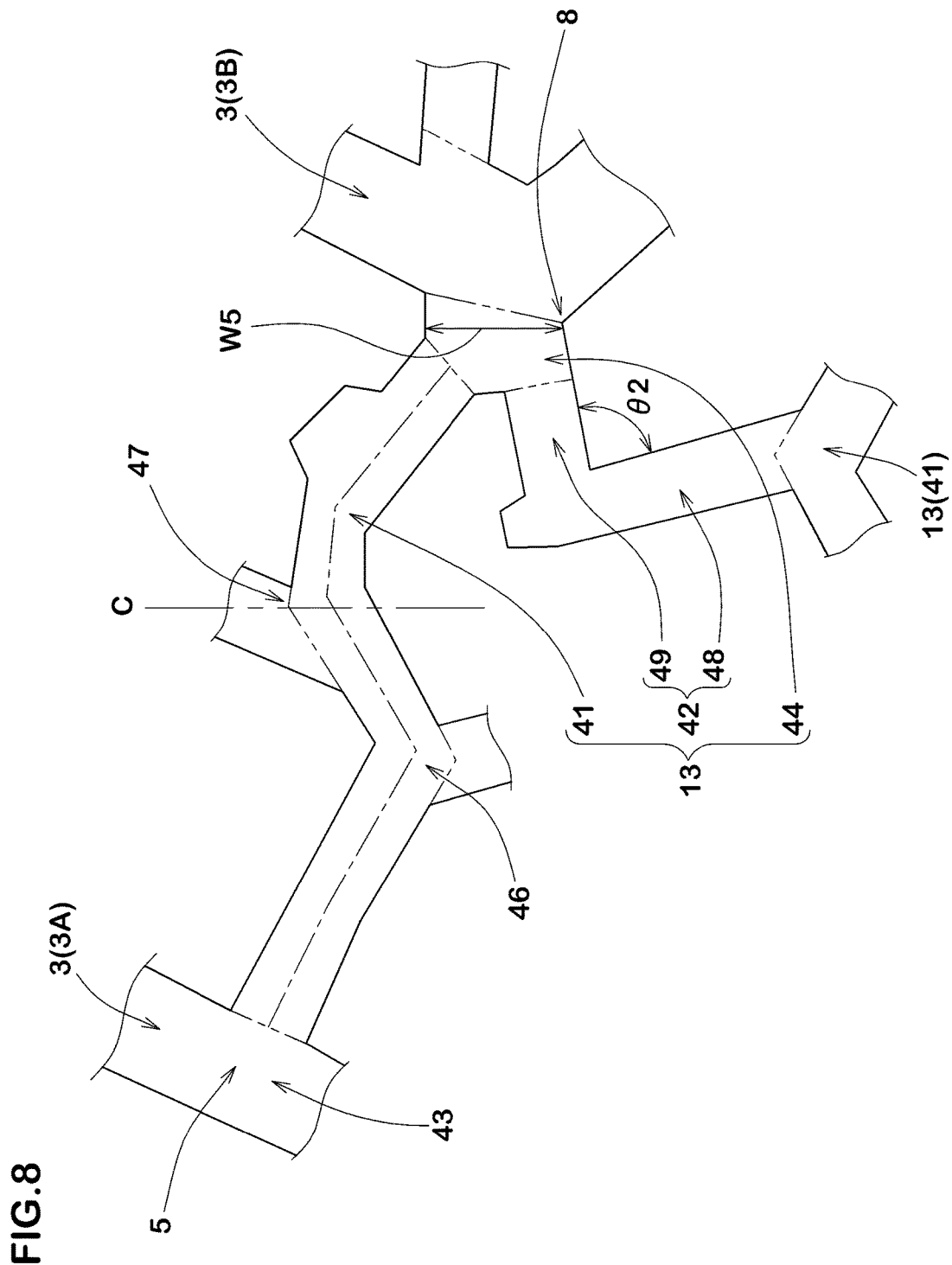
FIG. 8 is an enlarged view of a central lateral groove illustrated in FIG. 7.

FIG. 8 is an enlarged view of the central lateral groove 13. As shown in FIG. 8, each central lateral groove 13 includes a first groove portion 41, a second groove portion 42 and a confluence portion 44 at which the first groove portion 41 and the second groove portion 42 meet.

The first groove portion 41, for example, extends from the left side shoulder main groove 3A toward the right side shoulder main groove 3B so as to cross the tire equator C. The first groove portion 41, for example, is communicated with the shoulder main groove 3A at a location except the inner and outer corner portions 8 and 9 (shown in FIG. 1). In this embodiment, the first groove portion 41 extends from the first inclined element 5 of the shoulder main groove 3A to the shoulder main groove 3B through the confluence portion 44.

When the tire travels on snowy road, the snow compressed by each of the first groove portion 41 tends to be pushed axially outwardly. Thus, a hard snow column may be obtained at the intersection 43 between the first inclined element 5 and the first groove portion 41.

The first groove portion 41, for example, includes a plurality of corners including a downward protruding corner 46 and an upward protruding corner 47 in FIG. 8. Thus, the first groove portion 41 extends in an S-shaped manner. According to deformation of the tread portion in the axial direction when cornering on snowy road, such a first groove portion 41 may sufficiently compress snow to be introduced therein to increase traction.

The second groove portion 42 includes a first element 48 and a second element 49 which are connected so as to form a corner protruding axially inwardly. Preferably, an angle θ2 of the corner is in a range of from 80 to 90 degrees.

The second element 49 of the second groove portion 42 extends axially inwardly from the confluence portion 44 apart from the first groove portion 41. The first element 48 circumferentially extends axially outwardly from an axially inner end of the second element 49 to the other one of the first groove portions 41.

Each confluence portion 44 is communicated with each inner corner portion 8 of the shoulder main groove 3, for example. The confluence portion 44, for example, is configured as a small part of groove having a pair of groove edges extending in the axial direction of the tire. Each groove edge of the confluence portion 44 is connected to a groove edge of either one of the first groove portion 41 or the second groove portion 42. In this embodiment, the confluence portion 44 has a circumferential width W5 greater than the width W4 of the shoulder main groove 3. Preferably, the width W5 of the confluence portion 44 is in a range of from 1.1 to 1.4 times the width W4 of the shoulder main groove 3.

As shown in FIG. 1, an extended portion 50 in which the first groove portion 41 of the central lateral groove 13 is extended axially outwardly along its longitudinal direction overlaps with the shoulder dent portion 25 at least partially. In this embodiment, the extended portion 50 of the first groove portion 41 overlaps the first shoulder dent portion 28 at least partially. Thus, a hard snow column which is formed in the intersection between the shoulder main groove 3 and the central lateral groove 13 may be joined together with the snow in the shoulder dent portion 25 to form a large and hard piece of snow column, and therefore a large traction on snowy road may be obtained by shearing it.

The extended portion 50 is illustrated in FIG. 1 as a pair of two-dot chain lines each of which is obtained by extending each groove edge of the first groove portion 41 of the central lateral groove through the shoulder main groove 3. Preferably, the extended portion 50 of the first groove portion 41 overlaps with the first shoulder dent portion 28 at least a half width of the first shoulder dent portion 28.

Preferably, the first groove portion 41 may be connected to the shoulder main groove 3 at an angle θ3 in a range of from 80 to 90 degrees as shown in FIG. 2. Thus, the snow which is forced to move axially outwardly through the first groove portion 41 may be stayed at the first shoulder dent portion 28 without flowing along the longitudinal direction of the shoulder main groove 3, and then the snow may further be compressed. The snow compressed in the first shoulder dent portion 28 may be sheared by the shoulder block 14, thereby generating large snow traction to improve on-snow performance.

The first shoulder dent portion 28 has the maximum width W1 measured along a longitudinal direction of a part of the shoulder main groove 3 to which the shoulder dent portion is connected. Preferably, a width ratio W1/W2 of the maximum width W1 of the first shoulder dent portion 28 to the width W2 of the central lateral groove 13 is in a range of not less than 1.0, more preferably not less than 1.2, but preferably not more than 1.5, more preferably not more than 1.4, in order to improve the above advantageous effect while preventing uneven wear on a portion around the intersection between the shoulder main groove 3 and the central lateral groove 13.

Preferably, each of the central lateral grooves 13 has a part having a width which is gradually increasing toward the shoulder main groove 3 and is connected thereto. Such a central lateral groove 13 may provide snow smoothly to the shoulder main groove 3.

As shown in FIG. 7, each central lateral groove 13 include a first central lateral groove 55 having the outline shown in FIG. 8 and a second central lateral groove 56 having a point symmetrical outline of the first central lateral groove 55 with respect to a point on the tire equator C. The first central lateral groove 55 and the second central lateral groove 56 are arranged alternately in the circumferential direction of the tire. Further, each of the central lateral grooves 13 have one end connected with the shoulder main groove 3 and the other end connected with its circumferentially adjacent one of the central lateral grooves 13.

In this embodiment, a connecting groove 57 is arranged between circumferentially adjacent first and second central lateral grooves 55 and 56. The connecting groove 57 extends on or near the tire equator C, for example. Such a connecting groove 57 may be useful to improve wet performance and on-snow performance.

The central portion 11 is separated into a plurality of central blocks 60 by the first central lateral grooves 55, the second central lateral grooves 56 and the connecting grooves 57. The central blocks 60 include a first central block 61, a second central block 62 and a third central block 63.

The first central block 61 is arranged on the tire equator C and is separated among the first groove portions 41 and the second groove portions 42.

Figure 9:
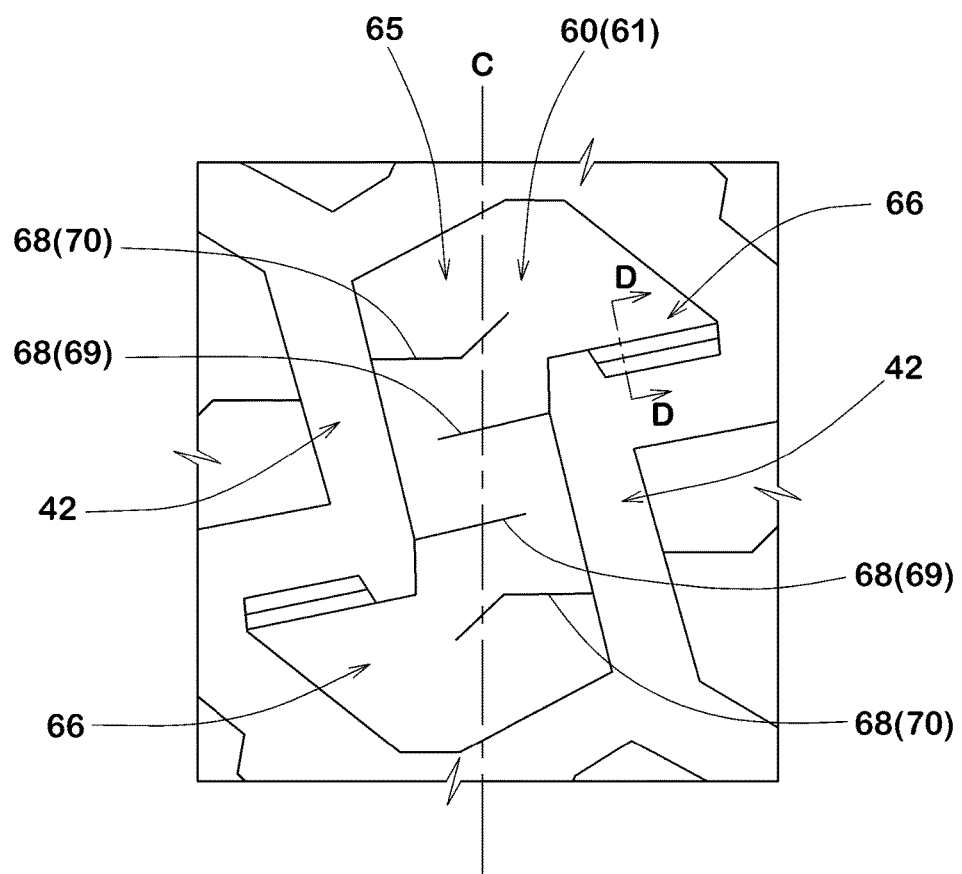
FIG. 9 is an enlarged view of a first central block illustrated in FIG. 7.

FIG. 9 illustrates an enlarged view of the first central block 61. As shown in FIG. 9, the first central block 61 includes a main portion 65 extending in the circumferential direction of the tire on the tire equator C and a pair of protrusive portions 66 each protruding in an axially opposite side from the main portion 65 at circumferential both ends of the main portion 65. Furthermore, each protrusive portion 66 is arranged in a point symmetrical place with respect to a point on the tire equator C. Such a first central block 61 may generate friction force in various directions by using its top surface edges to improve wet performance and on-ice performance.

Figure 10:
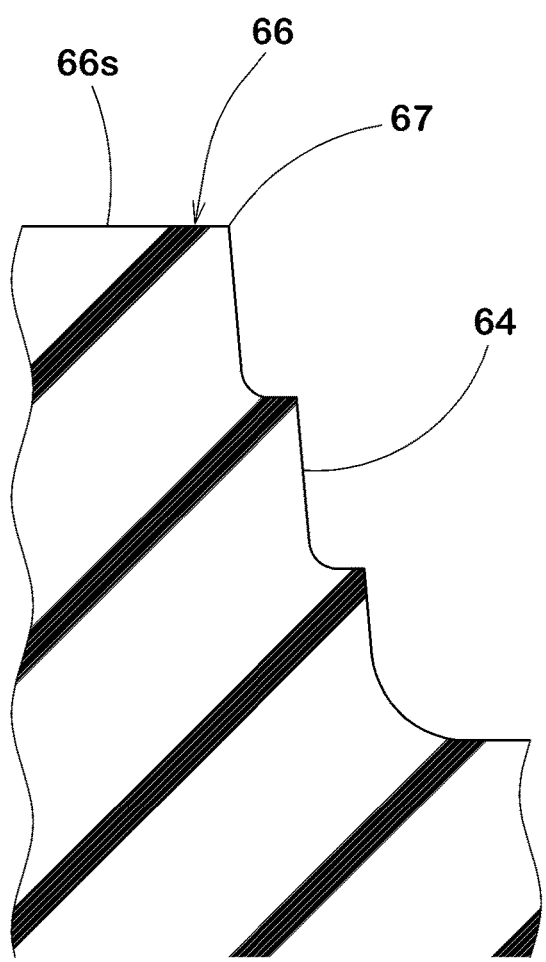
FIG. 10 is a cross-sectional view of a protrusive portion taken along lines D-D of FIG. 9.

FIG. 10 illustrates a cross-sectional view of the protrusive portion 66 taken along lines D-D of FIG. 9. As shown in FIG. 10, the protrusive portion 66 preferably includes a sidewall 64 extending radially inwardly in a step-like manner from an edge 67 of the top surface 66s. The protrusive portion 66 may increase traction on mud terrain while preventing the central lateral grooves 13 from stone-biting.

As shown in FIG. 9, the first central block 61 is provided with a plurality of first sipes 68 each of which extends from at least one of the second groove portions 42 and terminates within the block. In this embodiment, at least one of the first sipes 68 includes, for example, a straightly extending sipe 69 and a bent sipe 70, which are useful to improve edge effect of the first central block 61.

As shown in FIG. 7, the second central blocks 62 is arranged on axially both sides of the first central block 61. Each second central block 62 is arranged in a point symmetrical with respect to a point on the tire equator C. The second central block 62 is surrounded among one of the shoulder main grooves 3, one of the second groove portions 42 and one of the first groove portions 41 of the central lateral grooves 13.

Figure 11:
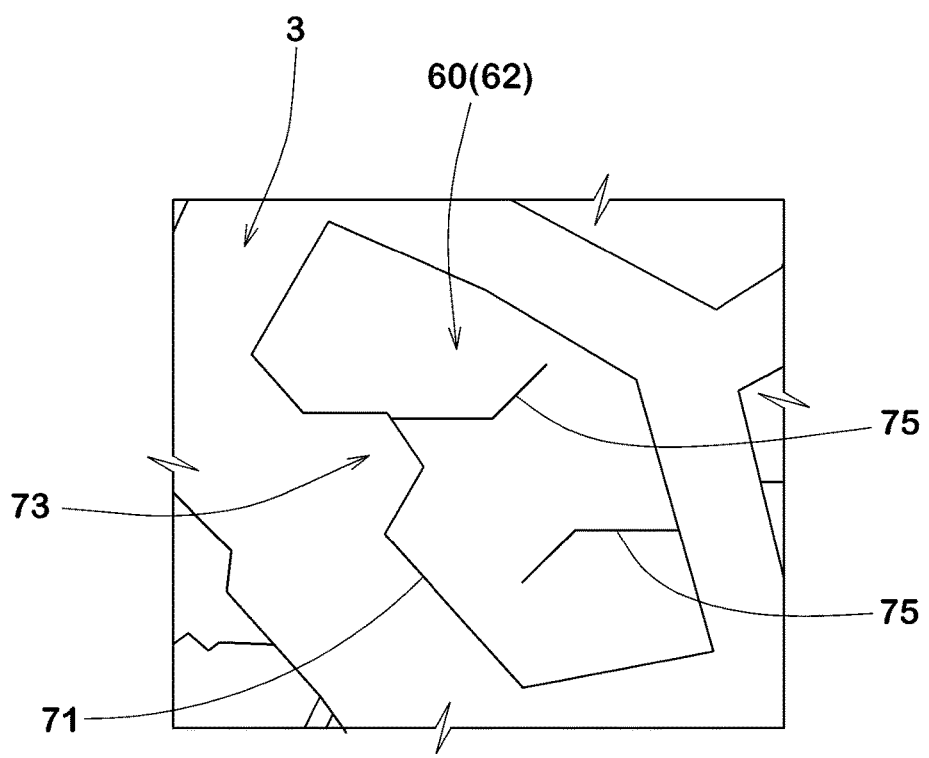
FIG. 11 is an enlarged view of a second central block illustrated in FIG. 7.

FIG. 11 illustrates an enlarged view of the second central block 62. As shown in FIG. 11, the second central block 62, for example, is provided with a central dent portion 73 on its axially outer edge 71. Preferably, the central dent portion 73 has a width in a direction along the axially outer edge 71 and which reduces toward axially inwardly. The central dent portion 73 may be useful to compress the snow introduced therein to form a hard snow pillar on snowy road and may shear it to generate large traction on snowy road. Preferably, the central dent portion 73 and the first shoulder dent portion 28 are alternately arranged in the circumferential direction of the tire, as shown in FIG. 1.

As shown in FIG. 11, the second central block 62 is provided with at least one second sipe 75 which extends from either one of the grooves or the central dent portion 73 and terminates within the block. Preferably, the second sipe 75 may be bent on its halfway so as to improve edge effect of the second central block 62.

As shown in FIG. 7, the pair of third central blocks 63 are provided so as to be located on both sides of the tire equator C between circumferentially adjacent central lateral grooves 13. Each of the third central blocks 63, for example, is arranged substantially in a point symmetrically with respect to a point on the tire equator C. The third central block 63, for example, is separated among one of the shoulder main grooves 3, circumferentially adjacent central lateral grooves 13 and 13, and one of the connecting grooves 57.

Figure 12:
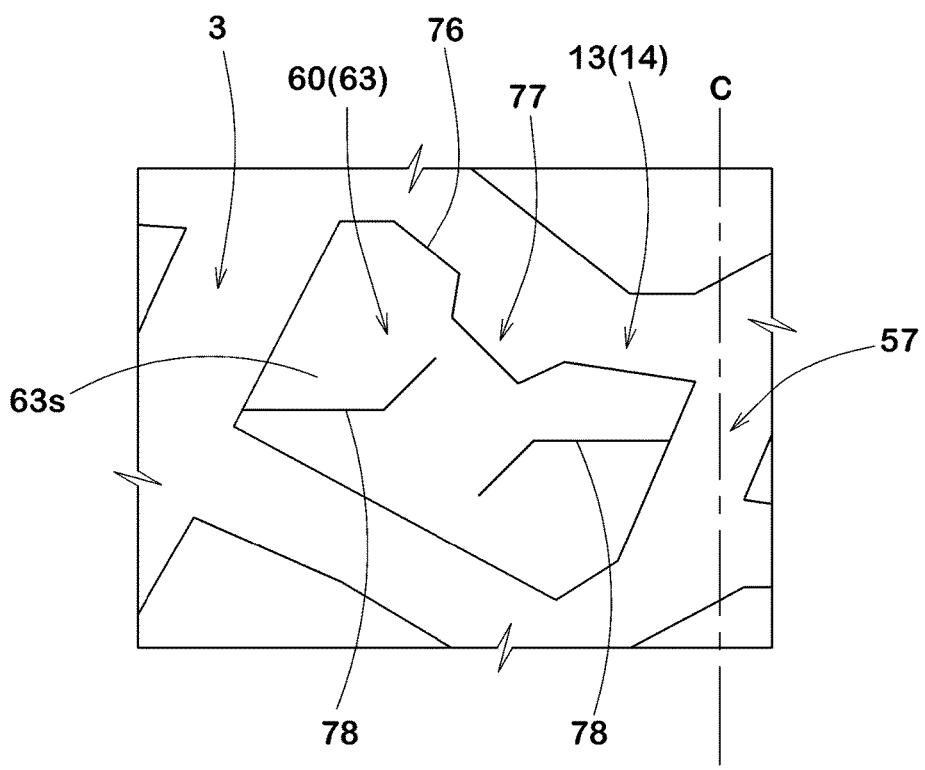
FIG. 12 is an enlarged view of a third central block illustrated in FIG. 7.

FIG. 12 illustrates an enlarged view of the third central block 63. As shown in FIG. 12, the third central groove 63 includes a top surface 63s with a pair of axially extending edges 76 and 76. In this embodiment, at least one of the edges 76 includes a dent portion 77 dented toward the center of the block. Preferably, the dent portion 77 of the third central block 63 has a width reducing gradually toward the center of the block. Such a dent portion 77 may be useful to ensure large traction on snowy road.

The third central block 63 is provided with at least one third sipe 78 extending from either one of the shoulder main grooves 3 or the connecting groove 57 and terminates within the block. Preferably, the third sipe 78 may be bent on its halfway. The third central block 63 with the third sipe 78 may improve advantageous edge effect while ensuring block rigidity, thereby improving steering stability on dry road as well as on-snow performance in a well balanced manner.

Figure 13:
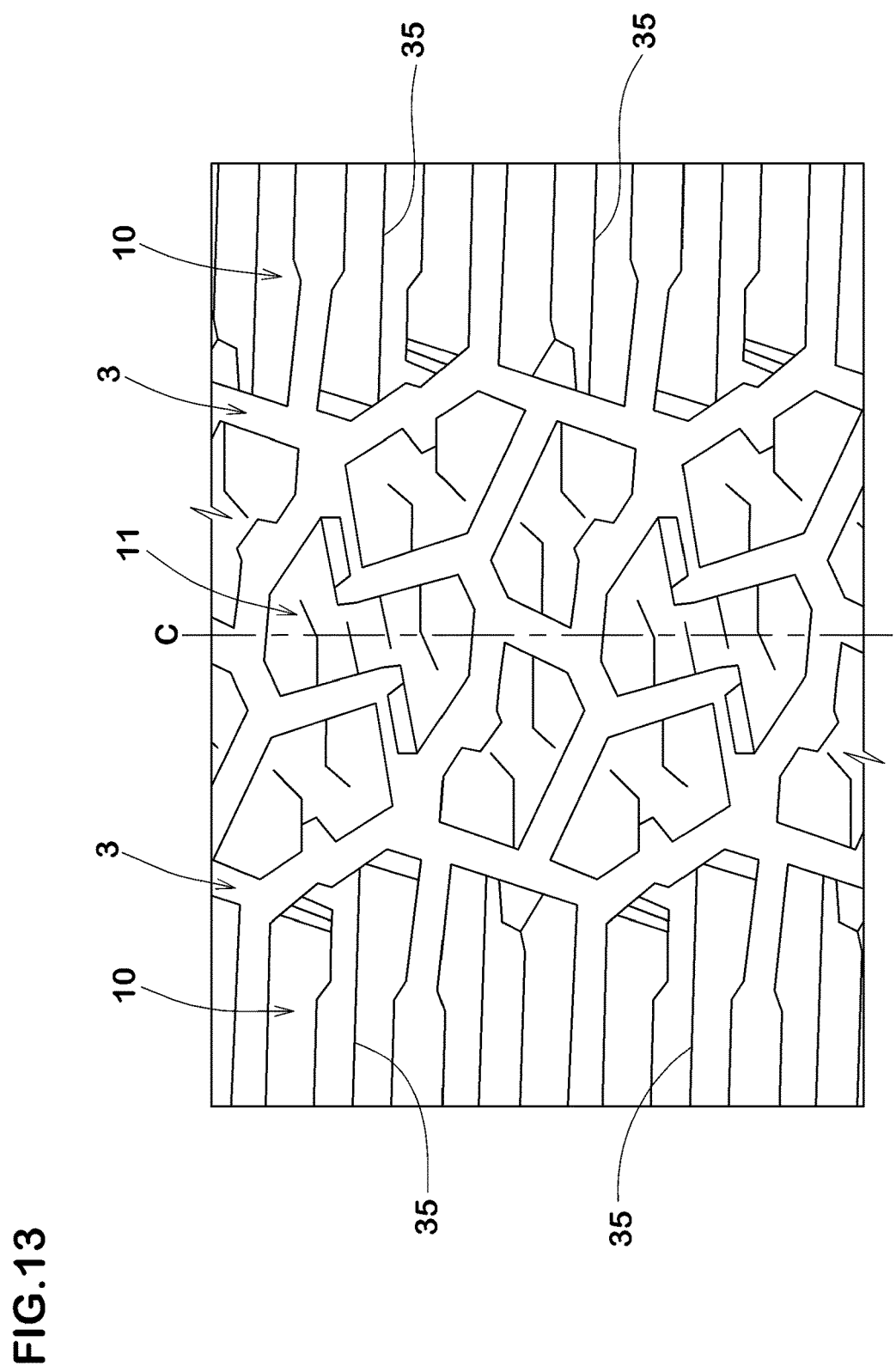
FIG. 13 is a development view of a tread portion in accordance with another embodiment of the present invention.
Figure 14:
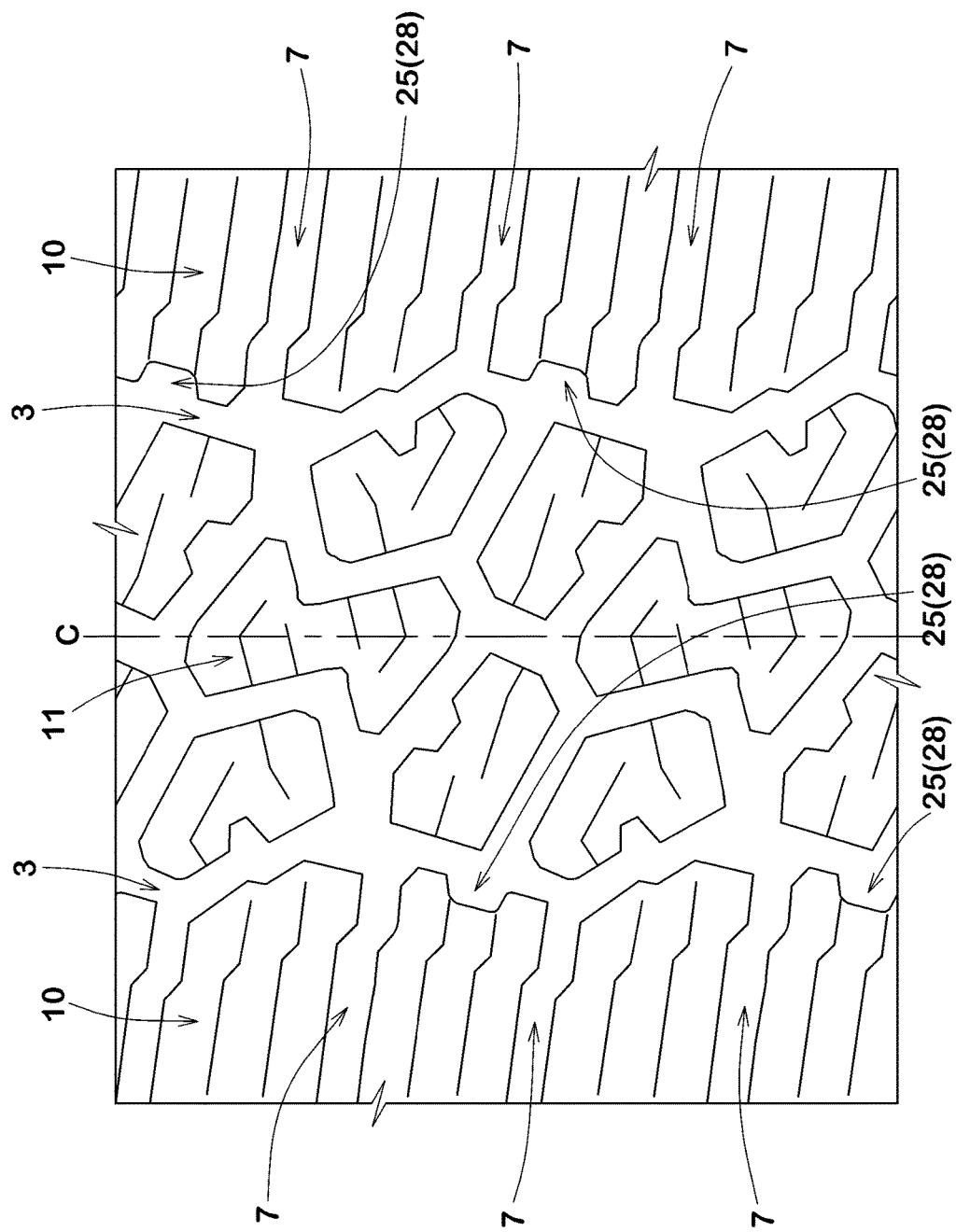
FIG. 14 is a development view of a tread portion in accordance with another embodiment of the present invention.

FIGS. 13 and 14 illustrate enlarged development views of tread portions in accordance with other embodiments of the present invention. In the embodiment shown in FIG. 13, the shoulder sipe 35 extends in a straight manner in order to ensure on-ice performance.

In the embodiment shown in FIG. 14, as the shoulder dent portion 25, only first shoulder dent portion 28 is provided and no second shoulder dent portion is provided. Alternatively, the shoulder lateral grooves 7 extend in a crank shape to reduce the air-pumping noise to be generated therefrom.

Figure 15:
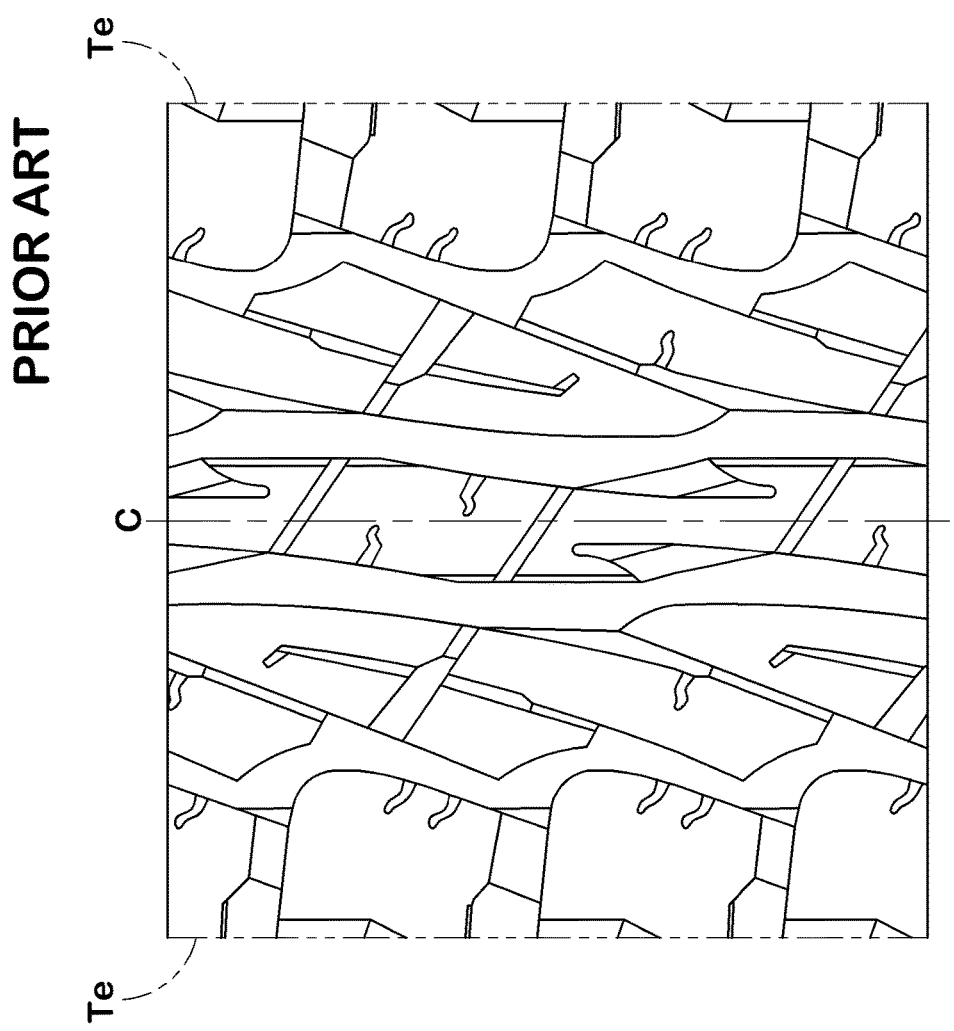
FIG. 15 is a development view of a tread portion in accordance with reference.

The present invention is more specifically described and explained by means of the following Examples and References. It is to be understood that the present invention is not limited to these Examples and embodiments described above Comparison test:

Pneumatic tires for SUV having a size of 265/70R17 and the tread pattern shown in FIG. 1 and Table 1 were manufactured. As a reference tire (Ref.), a tire having a tread pattern which includes the central lateral grooves whose extended portions do not overlap the respective shoulder dent portions was also manufactured, as shown in FIG. 15. Then, each tire was tested with respect to on-snow performance and wear resistance performance. Major common specifics of the tires and test methods are as follows.

Spec.:
Rim: 17×7.5
Internal pressure: 220kPa
Test vehicle: Four-wheel drive vehicle of 2,400 cc displacement
Location of test tire: All wheels
On-snow performance test:
Traveling performance on snowy road of the test vehicle was evaluated by a professional driver based on his feeling. The test results are shown using a score based on Ref. 1 being 100. The larger the value, the better the performance is.
Wear resistance test:
After traveling a certain distance on a dry road, the amount of wear on shoulder blocks was measured on each tire. The results are shown as respective reciprocal values of the amount of wear using an index of 100 representing a value of Ref. 1. The larger the value, the better the performance is.

Test results are shown in Table 1.

TABLE 1

|  | Ref. | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- |
| Tread pattern | FIG. 14 | FIG. 1 | FIG. 1 | FIG. 1 | FIG. 1 | FIG. 1 | FIG. 1 | FIG. 1 | FIG. 1 |
| Shoulder main groove angle θ1 (deg.) | 24 | 24 | 24 | 24 | 24 | 24 | 24 | 5 | 20 |
| Ratio L2/TWh | 0.60 | 0.60 | 0.60 | 0.60 | 0.60 | 0.60 | 0.60 | 0.60 | 0.60 |
| First shoulder dent portion length W3 (mm) | — | 5.6 | 5.6 | 5.6 | 5.6 | 5.6 | 5.6 | 5.6 | 5.6 |
| Ratio W1/W6 | — | 1.7 | 1.7 | 1.7 | 1.7 | 1.7 | 1.7 | 1.7 | 1.7 |
| Ratio W1/W2 | — | 1.2 | 0.90 | 1.0 | 1.5 | 1.6 | 2.5 | 1.2 | 1.2 |
| Corner angle θ3 (deg.) | — | 90 | 90 | 90 | 90 | 90 | 90 | 90 | 90 |
| On-snow performance (Score) | 100 | 110 | 105 | 108 | 110 | 110 | 112 | 105 | 108 |
| Wear resistance performance (Index) | 100 | 100 | 102 | 100 | 100 | 99 | 97 | 100 | 100 |

|  | Ex. 9 | Ex. 10 | Ex. 11 | Ex. 12 | Ex. 13 | Ex. 14 | Ex. 15 | Ex. 16 | Ex. 17 |
| --- | --- | --- | --- | --- | --- | --- | --- | --- | --- |
| Tread pattern | FIG. 1 | FIG. 1 | FIG. 1 | FIG. 1 | FIG. 1 | FIG. 1 | FIG. 1 | FIG. 1 | FIG. 1 |
| Shoulder main groove angle θ1 (deg.) | 30 | 60 | 24 | 24 | 24 | 24 | 24 | 24 | 24 |
| Ratio L2/TWh | 0.60 | 0.60 | 0.50 | 0.55 | 0.66 | 0.70 | 0.60 | 0.60 | 0.60 |
| First shoulder dent portion length W3 (mm) | 5.6 | 5.6 | 5.6 | 5.6 | 5.6 | 5.6 | 3.0 | 4.0 | 6.0 |
| Ratio W1/W6 | 1.7 | 1.7 | 1.7 | 1.7 | 1.7 | 1.7 | 1.7 | 1.7 | 1.7 |
| Ratio W1/W2 | 1.2 | 1.2 | 1.2 | 1.2 | 1.2 | 1.2 | 1.2 | 1.2 | 1.2 |
| Corner angle θ3 (deg.) | 90 | 90 | 90 | 90 | 90 | 90 | 90 | 90 | 90 |
| On-snow performance (Score) | 110 | 112 | 110 | 119 | 119 | 106 | 106 | 108 | 112 |
| Wear resistance performance (Index) | 99 | 97 | 99 | 100 | 100 | 100 | 100 | 100 | 99 |

|  | Ex. 18 | Ex. 19 | Ex. 20 | Ex. 21 | Ex. 22 | Ex. 23 | Ex. 24 | Ex. 25 |
| --- | --- | --- | --- | --- | --- | --- | --- | --- |
| Tread pattern | FIG. 1 | FIG. 1 | FIG. 1 | FIG. 1 | FIG. 1 | FIG. 1 | FIG. 12 | FIG. 13 |
| Shoulder main groove angle θ1 (deg.) | 24 | 24 | 24 | 24 | 24 | 24 | 21 | 20 |
| Ratio L2/TWh | 0.60 | 0.60 | 0.60 | 0.60 | 0.60 | 0.60 | 0.54 | 0.58 |
| First shoulder dent portion length W3 (mm) | 7.0 | 5.6 | 5.6 | 5.6 | 5.6 | 5.6 | 5.6 | 4.0 |
| Ratio W1/W6 | 1.7 | 1.5 | 2 | 2.5 | 1.7 | 1.7 | 2.5 | 1.2 |
| Ratio W1/W2 | 1.2 | 1.2 | 1.2 | 1.2 | 1.2 | 1.2 | 1.4 | 1.5 |
| Corner angle θ3 (deg.) | 90 | 90 | 90 | 90 | 70 | 80 | 85 | 80 |

TABLE 1-continued

| | | | | | | | | |
|---|---|---|---|---|---|---|---|---|
| On-snow performance (Score) | 113 | 107 | 108 | 107 | 105 | 108 | 109 | 108 |
| Wear resistance performance (Index) | 97 | 101 | 100 | 99 | 99 | 100 | 100 | 100 |

From the test results of Table 1, it is confirmed that the tires in accordance with the present embodiment exhibit in excellent on-snow performance while ensuring wear resistance performance.

What is claimed is:

1. A pneumatic tire comprising:

a tread portion provided with a circumferentially and continuously extending zigzag shoulder main groove located adjacent to a tread edge to define a shoulder portion axially outward of the shoulder main groove and central lateral grooves extending axially inwardly from the shoulder main groove, wherein the shoulder portion comprises a top surface having an axially inner edge facing the shoulder main groove and a sidewall extending radially inwardly from the inner edge, the sidewall of the shoulder portion being provided with shoulder dent portions dented axially outwardly from the shoulder main groove, wherein the central lateral grooves are located so that an extended portion in which each of the central lateral groove is extended axially outwardly overlaps with a respective one of the shoulder dent portions at least partially, wherein an axial distance from a tire equator to an axially outer end of each of the shoulder dent portions is in a range of from 0.55 to 0.66 times a tread half width which is an axial distance from the tire equator to the tread edge, wherein the tread portion further comprises a central portion located axially inward of the shoulder main groove, the central portion comprises a top surface having an axially outer edge facing the shoulder main groove and a sidewall extending radially inwardly from the outer edge, wherein the sidewall of the central portion is provided with central dent portions dented axially inwardly from the shoulder main groove, wherein the central dent portions and the shoulder dent portions are arranged alternately in a circumferential direction of the tire, wherein the shoulder main groove comprises first inclined elements inclined with respect to the circumferential direction of the tire and second inclined elements inclined in an opposite direction to the first inclined elements, wherein the central dent portions are communicated with only either the first inclined elements or the second inclined elements, wherein a maximum width of each of the shoulder dent portions is in the range of from 5.0 to 15.0mm, and wherein a length of each of the shoulder dent portions is in a range of from 3.0 to 7.0 mm, the length being measured perpendicular to a longitudinal direction of a part of the shoulder main groove to which the shoulder dent portion is connected.

2. A pneumatic tire comprising:

a tread portion provided with a circumferentially and continuously extending zigzag shoulder main groove located adjacent to a tread edge to define a shoulder portion axially outward of the shoulder main groove and central lateral grooves extending axially inwardly from the shoulder main groove, wherein the shoulder portion comprises a top surface having an axially inner edge facing the shoulder main groove and a sidewall extending radially inwardly from the inner edge, the sidewall of the shoulder portion being provided with shoulder dent portions dented axially outwardly from the shoulder main groove, wherein the central lateral grooves are located so that an extended portion in which each of the central lateral grooves is extended axially outwardly overlaps with a respective one of the shoulder dent portions at least partially, wherein an axial distance from a tire equator to an axially outer end of each of the shoulder dent portions is in a range of from 0.55 to 0.66 times a tread half width which is an axial distance from the tire equator to the tread edge, wherein the tread portion further comprises a central portion located axially inward of the shoulder main groove, the central portion comprises a top surface having an axially outer edge facing the shoulder main groove and a sidewall extending radially inwardly from the outer edge, wherein the sidewall of the central portion is provided with central dent portions dented axially inwardly from the shoulder main groove, wherein the central dent portions and the shoulder dent portions are arranged alternately in a circumferential direction of the tire, wherein the shoulder main groove comprises a first inclined element inclined with respect to the circumferential direction of the tire and a second inclined element inclined in an opposite direction to the first inclined element, wherein the shoulder portion further comprises a second dent portion dented axially outwardly from the shoulder main groove, wherein the second dent portion at least partially overlaps with an extended portion in which the first inclined element is extended in a longitudinal direction thereof, and wherein the second dent portion comprises a bottom provided with a sipe having a width in a range of from 0.5 to 1.0 mm.

3. The pneumatic tire according to claim 2, wherein the first inclined elements have a circumferential length greater than that of the second inclined elements, and wherein the shoulder dent portions are communicated with the first inclined elements.

4. The pneumatic tire according to claim 3, wherein the central lateral grooves communicate with the first inclined elements to form an angle in a range of from 80 to 90 degrees.

5. The pneumatic tire according to claim 2, wherein no grooves and openings are provided in an overlapping region in which the sidewall of the shoulder portion overlaps with an extended portion obtained by extending each of the central dent portions from both opening edges thereof in a direction perpendicular to the sidewall of the central portion adjacent to respective one of the opening edges.

6. The pneumatic tire according to claim 2, wherein each of the central lateral grooves has one end connected with the shoulder main groove and the other end connected with its circumferentially adjacent one of the central lateral grooves.

7. The pneumatic tire according to claim 2, wherein the central lateral grooves include a plurality of first central lateral grooves and a plurality of second central lateral grooves arranged alternately in the circumferential direction of the tire, and
wherein each of the second central lateral grooves having a point symmetrical outline of its adjacent one of the first central lateral grooves with respect to a point on the tire equator.

8. The pneumatic tire according to claim 2, wherein the central portion is divided into a plurality of central blocks by the central lateral grooves, and each of the central blocks comprise a top surface having a pair of axially extending edges facing one of the central lateral grooves, and
wherein at least one of the axially extending edges of the central blocks includes a central block dent portion dented toward the center of the block.

9. The pneumatic tire according to claim 2, wherein the tread portion further comprises a connecting groove connecting between circumferentially adjacent first and second central lateral grooves.

10. The pneumatic tire according to claim 2, wherein a depth of the shoulder dent portion is smaller than a depth of the shoulder main groove.

11. The pneumatic tire according to claim 2, wherein the tread portion includes shoulder lateral grooves, the shoulder lateral grooves including a first shoulder lateral groove and a second shoulder lateral groove, and
wherein each of the second shoulder lateral grooves comprises an axially inner portion connected to the shoulder main groove and an axially outer portion having a width greater than that of the inner portion.

12. The pneumatic tire according to claim 2, wherein each of the shoulder dent portions has a trapezoidal shape in a plan view.

13. The pneumatic tire according to claim 2, wherein each of the central dent portions has a trapezoidal shape in a plan view.

14. The pneumatic tire according to claim 2,
wherein the shoulder main groove comprises first inclined elements inclined with respect to the circumferential direction of the tire and second inclined elements inclined in an opposite direction to the first inclined elements, and
wherein the central dent portions are communicated with only either the first inclined elements or the second inclined elements.

15. The pneumatic tire according to claim 2,
wherein the shoulder main groove comprises first inclined elements inclined with respect to a circumferential direction of the tire, second inclined elements inclined in an opposite direction to the first inclined elements, inner corner portions protruding axially inwardly, and outer corner portions protruding axially outwardly,
wherein the tread portion includes shoulder lateral grooves, the shoulder lateral grooves include first shoulder lateral grooves each connected with the shoulder main groove at a position including one of the outer corner portions and second shoulder lateral grooves each connected with the shoulder main groove on an axially outer side of one of the inner corner portions and extending to connect between the shoulder main groove and the tread edge,
wherein the first shoulder lateral grooves and the second shoulder lateral grooves are arranged alternately one by one in the circumferential direction of the tire, and
wherein the shoulder portion comprises a top surface having an axially inner edge facing the shoulder main groove and a sidewall extending radially inwardly from the inner edge, the sidewall of the shoulder portion being provided with a shoulder dent portion dented axially outwardly from the shoulder main groove.

16. A pneumatic tire comprising:
a tread portion provided with a circumferentially and continuously extending zigzag shoulder main groove located adjacent to a tread edge to define a shoulder portion axially outward of the shoulder main groove, a plurality of shoulder lateral grooves extending axially outwardly from the shoulder main groove, and a central lateral groove extending axially inwardly from the shoulder main groove,
wherein the shoulder main groove comprises first inclined elements inclined with respect to a circumferential direction of the tire, second inclined elements inclined in an opposite direction to the first inclined elements, inner corner portions protruding axially inwardly, and outer corner portions protruding axially outwardly,
wherein the shoulder lateral grooves include only first shoulder lateral grooves each connected with the shoulder main groove at a position including one of the outer corner portions and second shoulder lateral grooves each connected with the shoulder main groove on an axially outer side of one of the inner corner portions and extending to connect between the shoulder main groove and the tread edge,
wherein the first shoulder lateral grooves and the second shoulder lateral grooves are arranged alternately one by one in the circumferential direction of the tire,
wherein the shoulder portion comprises a top surface having an axially inner edge facing the shoulder main groove and a sidewall extending radially inwardly from the inner edge, the sidewall of the shoulder portion being provided with a shoulder dent portion dented axially outwardly from the shoulder main groove, and
wherein the central lateral groove is located so that an extended portion in which the central lateral groove is extended axially outwardly overlaps with the shoulder dent portion at least partially.

* * * * *